US008218868B2

(12) United States Patent
Stern et al.

(10) Patent No.: US 8,218,868 B2
(45) Date of Patent: Jul. 10, 2012

(54) METHOD AND APPARATUS FOR ENHANCING IMAGES

(75) Inventors: Mark C. Stern, Princeton, NJ (US); Thomas Sudol, Yardley, PA (US)

(73) Assignee: Sensors Unlimited, Inc., Princeton, NJ (US)

( * ) Notice: Subject to any disclaimer, the term of this patent is extended or adjusted under 35 U.S.C. 154(b) by 1202 days.

(21) Appl. No.: 11/762,184

(22) Filed: Jun. 13, 2007

(65) Prior Publication Data

US 2008/0310714 A1    Dec. 18, 2008

(51) Int. Cl.
*G06K 9/00*    (2006.01)
*G06K 9/40*    (2006.01)

(52) U.S. Cl. .................. 382/168; 382/254; 382/274

(58) Field of Classification Search .......... 382/168, 382/254, 274
See application file for complete search history.

(56) References Cited

U.S. PATENT DOCUMENTS

| | | | |
|---|---|---|---|
| 4,868,651 A | 9/1989 | Chou et al. ............. 358/111 |
| 5,388,168 A | 2/1995 | Sakashita et al. | |
| 5,719,965 A | 2/1998 | Degi et al. ............. 382/254 |
| 5,799,106 A | 8/1998 | Mooney et al. ......... 382/172 |
| 5,857,033 A | 1/1999 | Kim ....................... 382/168 |
| 6,198,845 B1 | 3/2001 | Tse et al. | |
| 6,515,285 B1* | 2/2003 | Marshall et al. ........ 250/352 |
| 6,600,519 B1 | 7/2003 | Hwang | |
| 6,750,906 B1 | 6/2004 | Itani et al. ............ 348/229.1 |
| 7,113,648 B1* | 9/2006 | Aihara .................... 382/274 |
| 2003/0016881 A1 | 1/2003 | Matsuura | |
| 2003/0067546 A1 | 4/2003 | Asano | |
| 2005/0184981 A1 | 8/2005 | Aoki et al. | |
| 2007/0165282 A1* | 7/2007 | Sambongi et al. ....... 358/3.21 |
| 2007/0165947 A1* | 7/2007 | Paik ........................ 382/169 |
| 2009/0096898 A1* | 4/2009 | Sambongi ............... 348/254 |

FOREIGN PATENT DOCUMENTS

| | | |
|---|---|---|
| JP | 60051377 | 3/1985 |
| JP | 2171871 | 7/1990 |
| JP | 4207668 | 7/1992 |
| JP | 9065252 | 3/1997 |
| JP | 2000207545 | 7/2000 |
| JP | 2002232728 | 8/2002 |

(Continued)

OTHER PUBLICATIONS

Singh, et al., "Algorithms and Hardware Implementation of Real Time Automatic Gain Control Feature for Thermal Imager," Fourth Indian Conference on Computer Vision, Graphics & Image Processing, ICVGIP 2004, Dec. 16, 2004, pp. 326-331 (6 pages).

(Continued)

*Primary Examiner* — Bernard Krasnic
(74) *Attorney, Agent, or Firm* — McCarter & English, LLP (57) ABSTRACT

A method and an apparatus for enhancing images are provided. An input image generated by an imaging device, such as a short-wavelength infrared (SWIR) camera, sensor, or any other imaging device, is processed to produce an input histogram representing the distribution of pixel intensities in the input image. Histogram start and end points are determined, and a variable plateau profile is calculated depending upon the type of enhancement desired. The plateau profile could take on any desired shape or size, and two or more plateau regions could be included in the profile. The input histogram is clipped along the variable plateau profile. A cumulative histogram is constructed from the clipped histogram, and is normalized. The input image is then transformed into an enhanced output image using the normalized cumulative histogram as a look-up table.

34 Claims, 11 Drawing Sheets

FOREIGN PATENT DOCUMENTS

| | | | |
|---|---|---|---|
| JP | 2002232728 A | * | 8/2002 |
| JP | 2002290707 | | 10/2002 |
| JP | 2003264849 | | 9/2003 |
| JP | 2006086610 | | 3/2006 |
| JP | 2006195651 | | 7/2006 |
| JP | 2007104706 | | 4/2007 |
| WO | WO 2005104531 A1 | * | 11/2005 |

OTHER PUBLICATIONS

Weith-Glushko, "Quantitative Analysis of Infrared Contrast Enhancement Algorithms," Master Thesis of the College of Science Rochester Institute of Technology, Feb. 2007, pp. 14-25 (13 pages).

Kim, et al., "Region Based Histogram Specification for Dynamic Range Expansion," Proceedings of the SPIE—The International Society for Optical Engineering SPIE—Int. Soc. Opt. Eng USA, vol. 3302, 1998, pp. 90-97 (8 pages).

Vickers, "Plateau Equalization Algorithm for Real-Time Display of High-Quality Infrared Imagery," Optical Engineering, Soc. of Photo-Optical Instrumentation Engineers, vol. 35, No. 7, Jul. 1996, pp. 1921-1926 (6 pages).

Invitation to Pay Additional Fees and, Where Applicable, Protest Fee from the International Searching Authority mailed Mar. 25, 2009, issued in connection with International Patent Appln. No. PCT/US08/65892 (5 pages).

Virgil E. Vickers, "Plateau Equalization Algorithm for Real-Time Display of High-Quality Infrared Imagery," Opt. Eng. 35(7), 1921-1926 (Jul. 1996).

Sandberg, et al., "Design and Hardware Implementation of a Real Time Histogram Equalization Algorithm With Automatic Gain Feedback for a CMOS Camera Node,", Electronics Design Division at Mid-Sweden University, Electronics Design, May 12, 2003 (28 pages).

Ghosh, et al., "Volume Rendering for High Dynamic Range Displays," The University of British Columbia, Volume Graphics, 2005 (9 pages).

Wyant, "A Simple Interferometric MTF Instrument," Optics Communications, vol. 19, No. 1, Oct. 1976, pp. 120-121.

Wyant, "OTF Measurements With a White Light Source: An Interferometric Technique," Applied Optics, vol. 14, No. 7, Jul. 1975, pp. 1613-1615.

International Search Report of the International Searching Authority mailed Jul. 28, 2009, issued in connection with International Patent Appln. No. PCT/US08/065892 (5 pages).

Written Opinion of the International Searching Authority mailed Jul. 28, 2009, issued in connection with International Patent Appln. No. PCT/US08/065892 (10 pages).

Examination Report dated Jun. 4, 2010, issued by the European Patent Office in connection with European Patent Application No. EP08795883.1 (4 pages).

Canada Centre for Remote Sensing, "Glossary of Remote Sensing Terms," Nov. 21, 2005, printout from http://www.cct.nrcan.gc.ca/glossary/index_e.php?id=2944 (2 pages).

Bovik, "Nonlinear Point Operations on Images," Handbook of Image Video Processing, May 31, 2000, pp. 28-29 (4 pages).

Corrected International Search Report of the International Searching Authority mailed Oct. 15, 2009, issued in connection with International Patent Appln. No. PCT/US08/065892 (7 pages).

Written Opinion of the International Searching Authority mailed Oct. 15, 2009, issued in connection with International Patent Appln. No. PCT/US08/065892 (12 pages).

Office Action dated Nov. 3, 2011 issued by the European Patent Office in connection with European Patent Application No. 08795883.1 (8 pages).

Glushko, et al., "Quantitative Analysis of Infrared Contrast Enhancement Algorithms," Proc. Of SPIE vol. 6543 (2007) (12 pages).

Office Action, along with English Translation, dated Dec. 6, 2011 issued by the Japanese Patent Office in connection with Japanese Patent Application No. 2010-512273 (8 pages).

* cited by examiner

METHOD AND APPARATUS FOR ENHANCING IMAGES

BACKGROUND OF THE INVENTION

1. Field of the Invention

The present invention relates to image enhancement, and more specifically, to a method and apparatus for enhancing images using variable plateau histogram equalization.

2. Related Art

In various imaging applications, such as military imaging applications, it is often desirable to enhance an image acquired by a camera or sensor to reveal additional detail in the image. For example, where images are taken in the presence of a bright light, details in shadows and in bright areas are often lost. Likewise, details are often lost in dark areas of dark images. As such, it is desirable to reveal such details without compromising overall image quality.

A number of image enhancement methods have, in the past, been developed. Examples of such methods include contrast stretching, histogram equalization, histogram projection, and plateau equalization. In contrast stretching, pixel intensity distributions are expanded ("stretched") to occupy a full range of possible values. According to this method, minimum and maximum pixel intensity values are measured (or estimated), and offset and gain correction values are applied to the pixel intensity values corresponding to each pixel in the image, so that the full range of intensity values is occupied. In histogram equalization, the pixel intensity distribution is attenuated or flattened. According to this method, an input histogram is constructed, which includes the total number of pixels corresponding to each intensity level within the image. Then, a cumulative histogram is constructed and normalized, and each pixel in the image is transformed using the normalized cumulative histogram as a look-up table. In histogram projection, a histogram is constructed, consisting of occupied and unoccupied levels. A cumulative histogram is then constructed and normalized, and each pixel in the image is transformed using the normalized cumulative histogram as a look-up table. In plateau equalization, an input histogram is constructed and clipped at a specified level or "plateau." Then, a cumulative histogram is constructed and normalized, and each pixel in the image is transformed using the normalized cumulative histogram as a look-up table.

The foregoing image enhancement methods suffer from a number of drawbacks. For example, existing image enhancement methods do not adequately reveal detail in specific regions of an image, such as shadows or bright areas. Rather, these methods uniformly enhance an entire image, which may result in distortion of other regions of the image for the sake of enhancing a desired region of the image. Further, existing image enhancement methods cannot be easily adapted, without manual adjustment, to enhance images in different environments (e.g., by dynamically altering enhancement characteristics in response to changes in camera sensitivity).

Accordingly, what would be desirable, but has not yet been provided, is a method and apparatus for enhancing images which addresses the foregoing limitations of existing image enhancement methods.

SUMMARY OF THE INVENTION

The present invention relates to a method and apparatus for providing image enhancement, which can be utilized with any suitable imaging device (e.g., short wavelength infrared (SWIR) camera, sensor, imager, or any other device) to enhance images produced by the device. An input histogram corresponding to an image to be enhanced is constructed. The input histogram represents a pixel intensity distribution corresponding to the image. A variable plateau is established, and the input histogram is clipped at the plateau. The variable plateau could be formed in any desired size or shape, and can be varied to adapt to changing scene conditions, light levels, camera conditions, or in response to other conditions. Multiple plateaus can be established for enhancing desired regions of the image, such as dark regions (shadows) and bright areas of the image. A cumulative histogram is constructed from the clipped histogram, and is normalized to produce a normalized cumulative histogram. The normalized cumulative histogram is used as a look-up table to transform pixels of the input image to produce an enhanced output image. Automatic gain control (AGC) functions can be applied to provide additional enhancement of the image.

BRIEF DESCRIPTION OF THE DRAWINGS

These and other important objects and features of the invention will be apparent from the following Detailed Description of the Invention, taken in connection with the accompanying drawings, in which.

DETAILED DESCRIPTION OF THE INVENTION

The present invention relates to a method and apparatus for enhancing images. Desired aspects of an image, such as shadow regions or bright areas of the image, can be enhanced by the present invention to provide additional detail. An input image acquired by an imaging device, such as a short-wavelength infrared (SWIR) camera, sensor, or any other imaging device, is processed by the present invention to produce an input histogram representing the distribution of pixel intensities in the input image. Optionally, saturated and/or low pixels in the input image can be excluded. Histogram start and end points are determined, and a variable plateau is calculated depending upon the type of enhancement desired. The plateau may be varied along the histogram and can take on any desired shape, size, or number of plateau regions. When the plateau is calculated, the histogram is clipped therealong. A cumulative histogram is constructed from the clipped histogram, and is normalized. The input image is then transformed into an enhanced output image using the normalized cumulative histogram as a look-up table. Optional non-linear operations can be performed on the normalized cumulative histogram. The enhancement method can be automatically varied to adapt to various imaging device types as well as changes in scene conditions.

Figure 1:
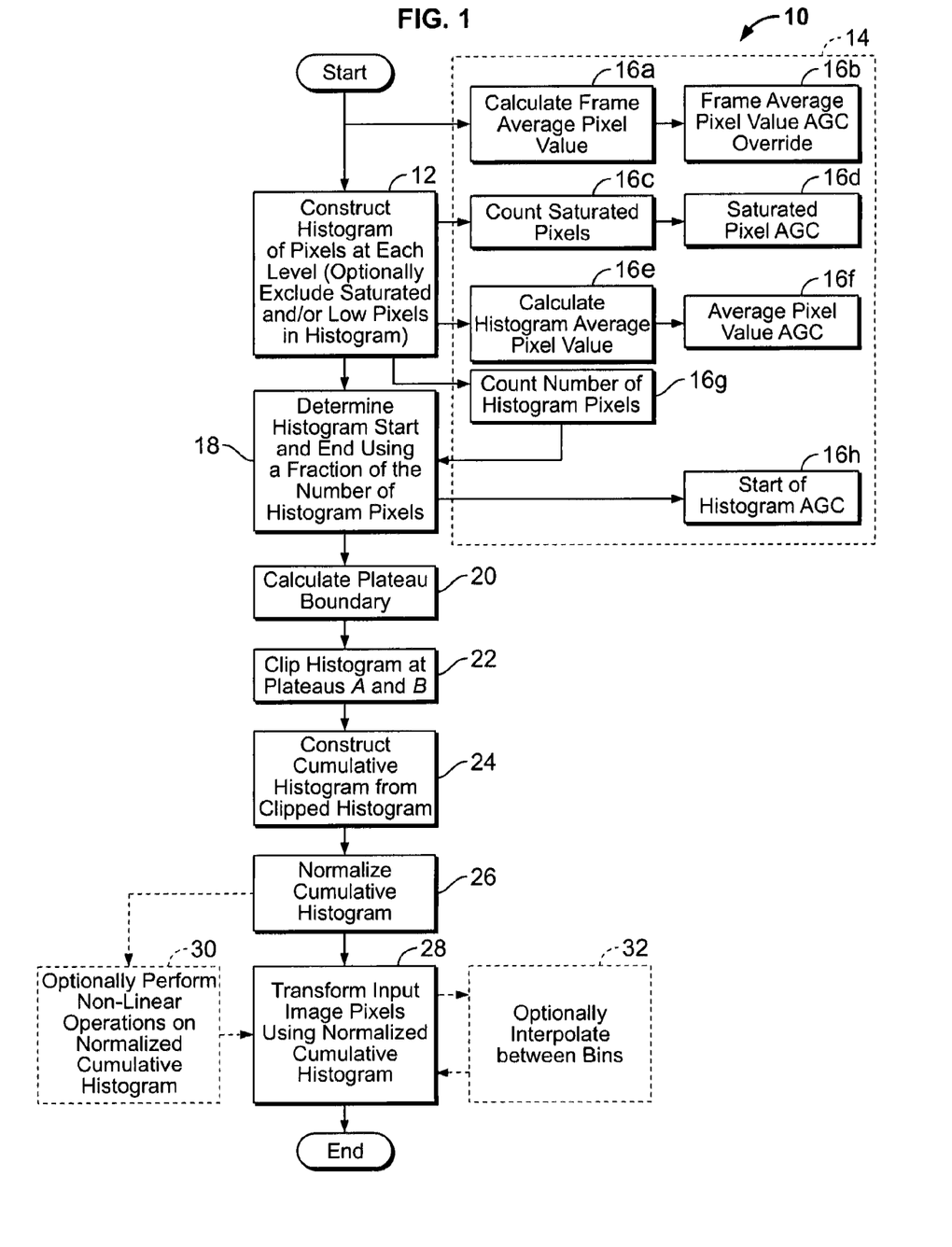
FIG. 1 is a flowchart showing a method according to the present invention for enhancing an image.

FIG. 1 is a flowchart showing a method according to the present invention, indicated generally at 10, for enhancing an image. In step 12, an input histogram is constructed, wherein the bins of the histogram represent the pixel intensity distribution of the image. Optionally, saturated (i.e., pixels having an intensity level above a pre-defined threshold) and/or low pixels (i.e., pixels having an intensity level below a pre-defined threshold) can be excluded from the histogram. It should be noted that a user could specify a minimum number of pixels to be collected before histogram processing.

In process block 14, automatic gain control (AGC) processes are initiated for controlling the gain of the output image. In step 16a, the average pixel value of an image frame is calculated. Then, in step 16b, if the calculated average pixel value is at or near a pre-defined minimum or maximum pixel value, AGC processing is disabled. This prevents the present invention from remaining indefinitely in an AGC processing condition which can result if a camera is operating in a darkened room and lights are abruptly turned on and saturated pixels are removed from the image, or if a camera is operating in a bright-lit room and lights are abruptly turned off and low pixels are removed from the image. Parameters other than the average pixel value can be used for this process, including the number of saturated pixels expressed as a percentage of the total pixels collected, or the number of low pixels expressed as a percentage of the total pixels collected.

In step 16c, the number of saturated pixels in the input image is counted. In step 16d, the saturated pixels are used for AGC adjustment of an imager or camera, as discussed below with reference to FIG. 2. In step 16e, the average histogram pixel value is calculated. Then, in step 16f, the average pixel value is used for AGC adjustment of an imager or camera, as discussed below with reference to FIG. 2. In step 16g, the number of histogram pixels is counted. This information is later used in step 16h, wherein AGC adjustments are made based on the start of the histogram, as discussed below with reference to FIG. 2.

In step 18, histogram start and end values are determined, using a portion (fraction) of the number of histogram pixels. The start of the histogram is the first bin to exceed an input minimum or "floor" value and the end of the histogram is the last bin to exceed the input floor value. When the method 10 is first carried out, the input floor level could be set to a pre-defined level, which could be programmed by a user. Other methods to determine the start and end of the histogram are possible. For example, starting at the lowest histogram bin, the start of the histogram could be found when the cumulative pixels are at least a percentage (e.g., 1.5%) of the total number of pixels collected. Moving through the histogram, the end of the histogram could then be found when the cumulative pixels are at least 100% minus a percentage (e.g., 100%−1.5%=98.5%) of the total number of pixels collected. In this example, the histogram, from start to end, would contain approximately 97% of the total number of pixels collected. Such a method has been found to be less sensitive to noise. Another alternative is to use the input floor value, described above, for the number of pixels needed at each end of the histogram instead of using a percentage of the total number collected. Still further, other methods for calculating a floor value could be utilized, such as taking a fraction of the average number of pixels per bin, or a fraction of the average pixel value per bin.

The plateau profile could include two plateaus (illustratively, plateaus "A" and "B") which correspond, respectively, to a "dark" plateau and a "light" plateau. The "dark" plateau represents a clipping level for enhancing details in shadows or dark regions of the input image. The "light" plateau represents a clipping level for enhancing details in light regions of the input image. In step 20, a plateau boundary is calculated, which represents the bin at which the clipping level transitions from plateau A to plateau B. Of course, the plateaus could take any shape and could be adjusted as desired. Importantly, the plateaus and the transitions between plateaus can be varied to highlight desired regions of the input image, and could also be automatically changed (e.g., by electronic means) to adjust to various operating parameters of different cameras or sensors, as well as to changing light levels or other scene conditions. Additionally, the plateau profile could vary from bin to bin of the histogram.

After the plateau boundary has been calculated in step 20, in step 22, the input histogram is clipped at the plateaus, such that all values above the clipping levels are reduced to the clipping levels. If two plateaus (such as plateaus A and B, discussed above) are defined, the histogram is clipped at the two plateaus. After clipping, in step 24, a cumulative histogram is constructed from the clipped histogram. Each bin in the cumulative histogram includes the total number of pixels in the current bin plus the number of pixels in the preceding bin. The cumulative histogram is thus the integral of the distribution represented by the clipped input histogram.

In step 26, the cumulative histogram is normalized to the number of output levels in the output image. For example, if 256 possible output values are in the output image, the cumulative histogram would be normalized to the 256 output values from 0 to 255. Optional step 30 could then be carried out, wherein non-linear functions (discussed below with respect to FIG. 3) are applied to the normalized cumulative histogram. In step 28, pixels of the input image are transformed using the normalized cumulative histogram as a lookup table (as is done in conventional histogram equalization and plateau equalization processes), to produce the output image. Optionally, step 32 can be carried out to produce an output image using an interpolation procedure (discussed below with respect to FIG. 4). The output image produced in step 28 is thus enhanced to show additional detail in desired regions of the input image.

Figure 2:
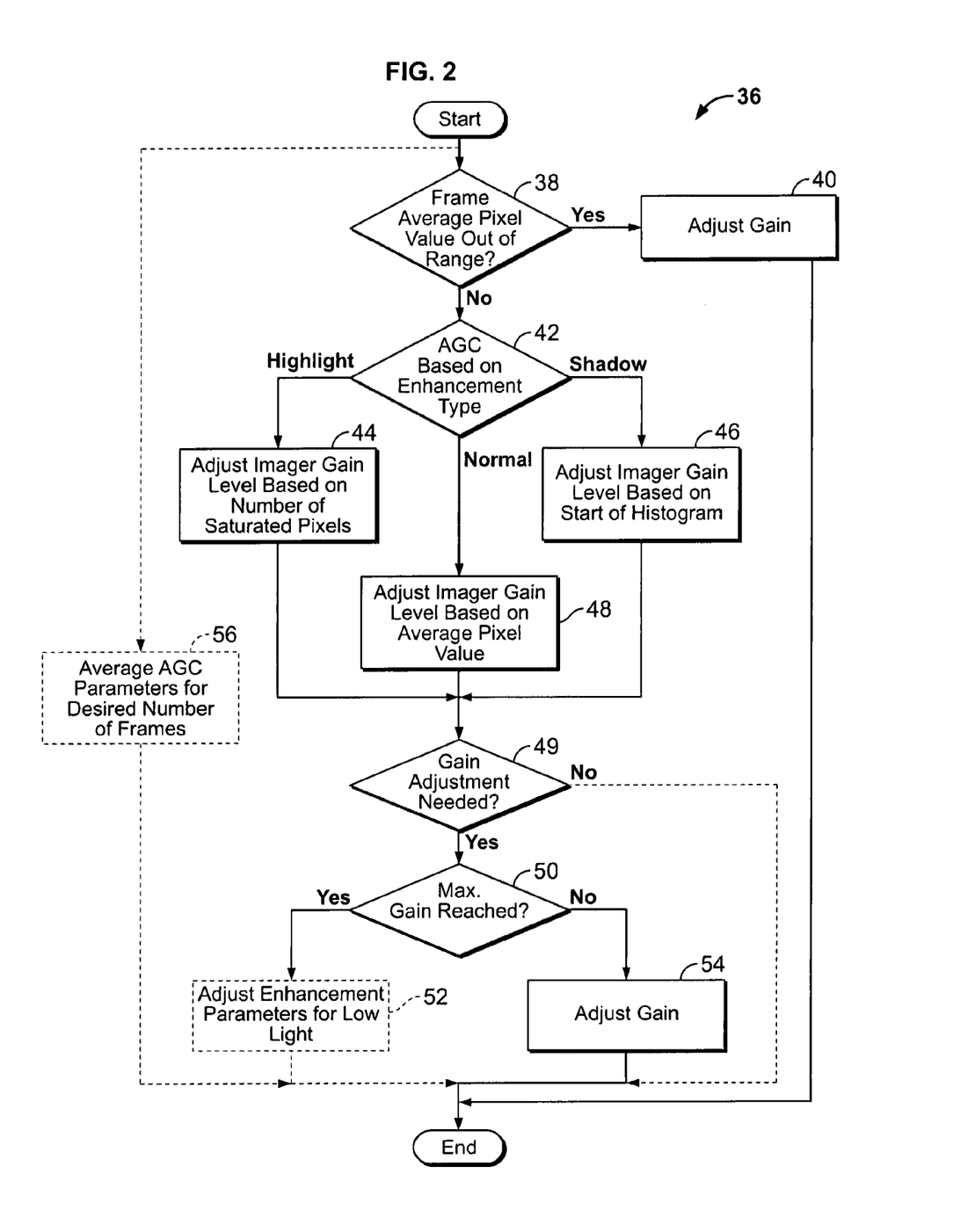
FIG. 2 is a flowchart showing enhanced automatic gain control features of the present invention for providing additional image enhancement.

FIG. 2 is a flowchart, indicated generally at 36, showing enhanced automatic gain control (AGC) features of the present invention for providing additional image enhancement. As mentioned above, the present invention can be applied to enhance various aspects of an input image, so as to accentuate highlights in the image, details in shadows, or normal enhancement of the input image based on average pixel values. In step 38, a determination is made as to whether the average pixel value of a frame (saturated and low pixels are included) is out of a pre-defined range. In a 12-bit system, a suitable range could include values less than 3 or more than 4000. If a positive determination is made, step 40 is invoked, wherein the gain of the imager is adjusted (e.g., in the same manner used for normal AGC functions). Otherwise, in step 42, a determination is made as to the type of enhancement desired for automatic gain control. If it is determined that highlight enhancement is desired, step 44 is invoked, wherein the gain level of the imager (e.g., SWIR camera, sensor, or any other suitable type of device) is set based on the number of saturated pixels in the input image. If it is determined that normal enhancement is desired, step 48 is invoked, wherein the imager gain level is set based on the average pixel value for all pixels, optionally minus the saturated and/or low-value pixels, in the input image. If it is determined that shadow enhancement is desired, step 46 is invoked, wherein the imager gain level is set based on the start of the input histogram (where low-level pixels are represented in the input histogram) to accentuate detail in shadow regions of the input image. It should be noted that a stepped digital gain can be applied in step 52 so that the imager's dark histogram is expanded to cover additional histogram bins. The result is a higher contrast, more pleasing image. As described below, the digital gain is increased in low-light mode and is independent of the chosen AGC method.

Once the desired enhancement type has been selected and the corresponding gain of the imager adjusted, a determination is made in step 49 as to whether gain adjustment is needed. If not, processing ends. If a positive determination is made, step 50 occurs, wherein a determination is made as to whether additional gain is required, even though the imager may already be adjusted to a maximum gain level. If a positive determination is made, optional step 52 occurs, wherein enhancement parameters are further adjusted for low light level conditions. In step 54, the gain of the imager is adjusted to the gain level set in either of steps 44, 46, or 48, or as modified in optional step 52.

In optional process 56, average AGC parameters for the desired number of frames of the input image can be determined, and adjusted as desired. Such a feature can operate in conjunction with the other processes shown in FIG. 2, so as to provide added enhancement over a specific number of frames of the input image. It should also be noted that the enhanced AGC processing shown in FIG. 2 could be employed independent of the processing shown in FIG. 1 and discussed above, or in conjunction therewith.

The gain adjustment feature of the present invention allows for gain changes in steps of roughly 2.2. Look-up tables can be used for each gain range (operational setting or "OPR") to set the various electrical parameters of the imager. If the gain is changed while the AGC parameters are averaged over n frames, the output of the averager will not immediately change in response to the step gain change. Thus, it is possible that the present invention will keep changing the gain until the change appears at the output of the averager, causing the AGC to overshoot and hunt or oscillate. In the present embodiment, for example, the camera runs at 60 frames per second (~0.5 seconds for 32 frames) and the AGC algorithm runs every 0.1 second. One solution for addressing this possibility is to lower the AGC sample rate after a gain change and wait for the change to propagate through the averager before examining its output.

The AGC features of the present invention could be augmented by the inclusion of a "boxcar averager" to average AGC data from 1 to 32 frames, so as to provide for continuous gain adjustments that are immediately available in the output image. The boxcar averager includes a common timing scheme for all data streams. The boxcar averager could be implemented in the following steps: (1) after a gain change, wait a first predetermined period of time for electrical adjustments to settle (for example, 0.1 seconds per AGC period); (2) wait a second predetermined period of time for the camera hardware to acquire at least one new frame at the new gain setting (for example, 1/60 second), and calculate the new AGC parameters; (3) store the new AGC parameters (i.e., "fill" all the boxcars with the new AGC parameters); and (4) resume normal boxcar operation and normal AGC calculations. It has been found that such an implementation results in gain changes that can be quickly implemented in the output image, without oscillation, when operated with 32 frame averaging.

Figure 3:
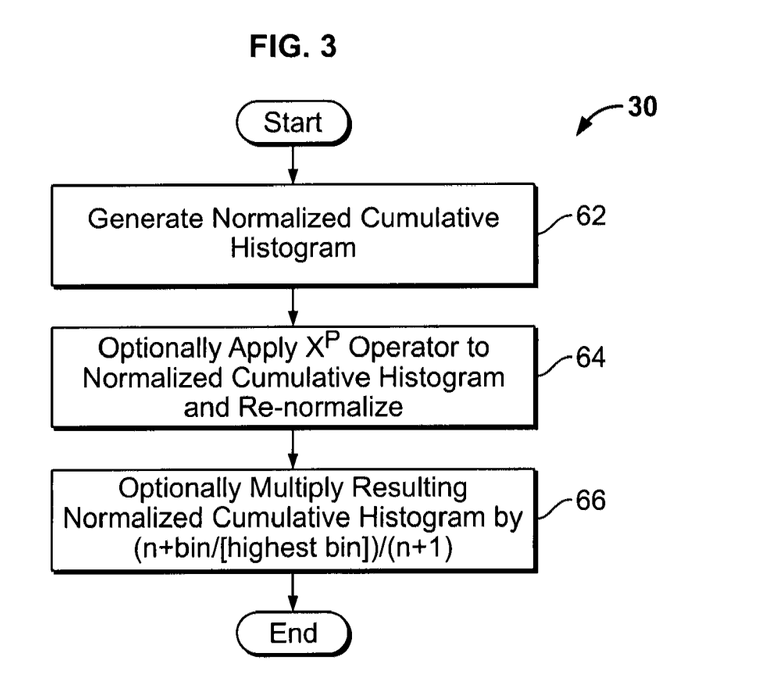
FIG. 3 is a flowchart showing, in greater detail, optional non-linear operations according to the present invention for providing additional image enhancement.

FIG. 3 is a flowchart showing, in greater detail, the optional non-linear operations step 30 of FIG. 1. The optional non-linear operations provide additional enhancement of the input image. In step 62, the normalized cumulative histogram is generated. Then, in step 64, the square root of the data contained in each bin in the normalized cumulative histogram is calculated ($X^p$ operator) and applied to the normalized cumulative histogram, and the cumulative histogram is re-normalized. In step 66, the resulting normalized cumulative histogram is multiplied by a ramp function of (n+bin/[highest bin])/(n+1), where bin represents the current bin and highest bin represents the highest bin in the histogram. It has been found that the square root operation in step 64 results in increased detail of images in the presence of bright light sources. Of course any other suitable linear or non-linear operations could be employed without departing from the spirit or scope of the present invention. For example, the square root processing function could be generalized from $n^{0.5}$ to $n^p$, where p is a value specified by the user. It has been found that some scenes look better with p values other than 0.5. Also, a sin processing function of (n+sin(π/2*bin/[highest bin]))/(n+1) could be applied in step 64. It has been found that using a ramp function in step 66 improves operation in the presence of veiling glare, i.e., stray light in optical systems caused by reflections between surfaces of lens elements and inside the barrel of a lens. Moreover, user-defined lookup tables could be applied in place of Is the square root and sin operations discussed above.

Figure 4:
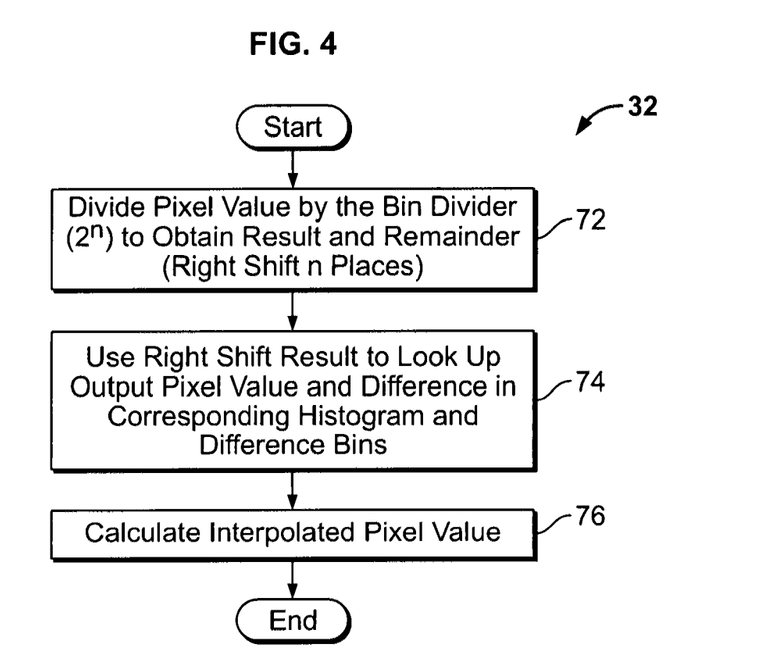
FIG. 4 is a flowchart showing, in greater detail, an optional process according to the present invention for interpolating pixel values.

FIG. 4 is a flowchart showing, in greater detail, the optional interpolation step 32 of FIG. 1. The interpolation process can be used to reduce quantization effects (i.e., "contouring" or loss of detail when converting a gradient image into a image with a smaller number of intensities or values) that can result when the normalized cumulative histogram contains fewer bins than the number of pixel levels actually present in the input image. The interpolation process could also be used to reduce contouring resulting from other causes, such as contrast stretching. In step 72, a given pixel value (e.g., the first bin in the normalized cumulative histogram) is divided by a bin divider of $2^n$, where n represents an integer value that produces a desired number of bins. For example, with 12-bit pixels (4096 levels) and n=4 ($2^n=16$), the number of bins is 256 ($2^{12}/2^4=2^8$). It has been found that bin dividers of $2^n$ are easily determined using computing hardware but, of course, any other suitable bin divider value could be used. The output of step 72 produces a result and a remainder, which represent a right shift of n places. In step 74, the right shift is used to retrieve a pixel value and a difference in corresponding histogram and difference bins. For example, if the pixel value is 46, the result of 46/16 is 2 and the remainder is 14. The corresponding pixel value for bin 2 of the normalized cumulative histogram (e.g., 200) would be retrieved. The most significant bits (MSBs) of the 12-bit output pixel are: 200*16=3200. Then, in step 76, the pixel value for the next highest bin (i.e., adjacent bin) is retrieved (e.g., bin 3, which could have a value of 232). The difference between the bin value corresponding to the bin (bin 2, with value of 200) and the next highest bin (bin 3, with value of 232) is calculated (232−200=32), and the difference is multiplied by the remainder to calculate the least significant bits (LSBs) of the 12-bit output pixel (32*14=448). The interpolated 12-bit output pixel value would be the sum of these two steps (3200+448=3648). The resulting interpolated bin (pixel) value can be used as an actual pixel value, and can be included in the enhanced output image. Mathematically, the calculation could be expressed as (bin 1+(bin 2−bin 1)*remainder/bin divider)*bin divider=bin 1*bin divider+(bin 2−bin 1)*remainder.

The interpolation process of the present invention could be advantageously implemented using two lookup tables, wherein the first lookup table contains the cumulative histogram data corresponding to the input image, and the second lookup table contains the differences between entries in the first lookup table. The difference calculation can be performed as the tables are created, to prevent the need for calculating in real time. If each pixel of the input image is twelve bits in length, the most significant 8 bits would be used as a lookup key for the lookup tables. A number proportional to the least significant 4 bits is added to the most significant 8 bits, resulting in an interpolated 12 bit pixel. This could be expressed mathematically as follows: interpolated output pixel value=(8-bit cumulative histogram bin value)*bin divider+(least significant 4 bits of input pixel)*difference. It has been found that for a small number of bins, e.g., 64, interpolation has improved the output image in many observed circumstances. For 256 bins, interpolation has also improved the image in a few observed circumstances.

FIGS. 5*a*-5*g* depict sample histograms illustrating variable histogram plateaus that can be implemented by the present invention. Advantageously, the present invention allows for a multitude of plateaus of various shapes to be defined and utilized to clip an input histogram so as to enhance desired aspects of the input image.

Figure 5A:
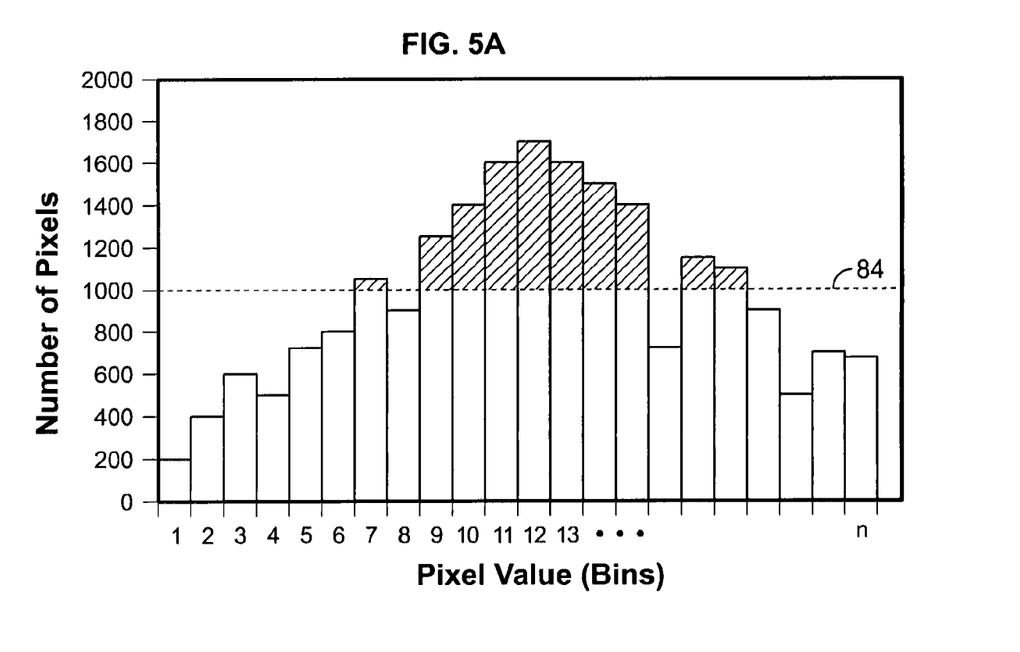
FIGS. 5a-5g depict sample histograms illustrating variable histogram plateaus implemented by the present invention.

FIG. 5*a* depicts a sample histogram wherein the present invention implements a horizontal plateau 84 across the histogram bins. The horizontal plateau 84 allows for conventional plateau equalization known in the art, wherein the bins are clipped at the plateau 84 (i.e., pixel frequencies above the plateau 84 are brought down to the plateau 84, as illustrated by the shaded portions of the bins in FIG. 5*a*). Advantageously, the enhanced AGC functionality of the present invention could also be applied once an output image is generated using the clipped histogram, to provide additional enhancement, regardless of the type of histogram plateau implemented by the present invention.

Figure 5B:
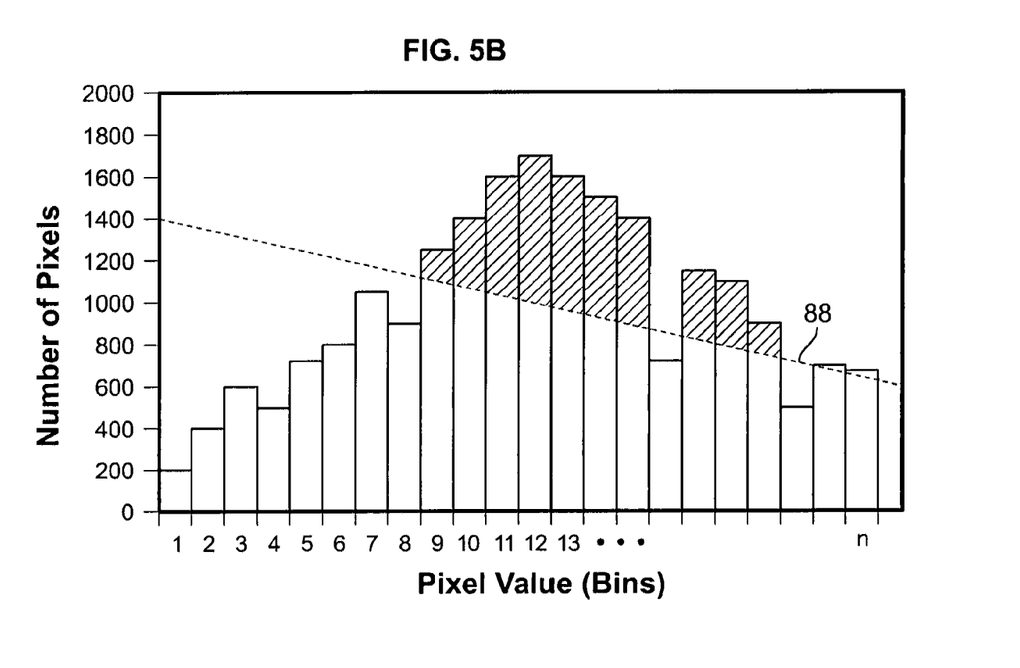
Figure 5C:
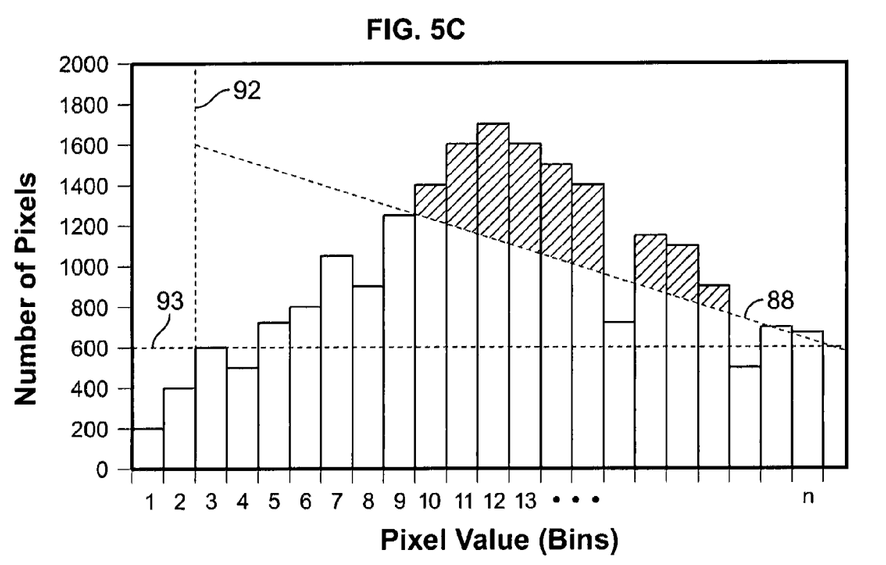
Figure 5D:
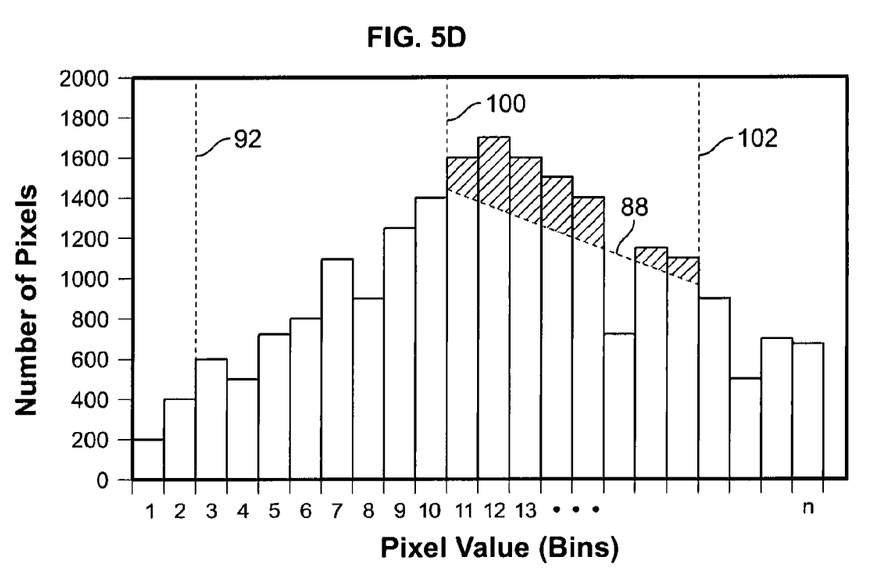

FIG. 5*b* shows a sample histogram wherein the present invention implements a sloped or "tapered" plateau 88 across the histogram bins. It has been found that the sloped plateau 88 produces good enhancement of images where lighting changes from scene to scene. As shown in FIG. 5*c*, an optional offset 92 could be provided, wherein the sloped plateau 88 begins at the offset 92. Also, an optional input floor 93 could be included, wherein a minimum bin value of a pre-defined threshold is established for all bins. As shown in FIG. 5*d*, the plateau 88 could be implemented between a maximum threshold 102 and a midpoint 100 which represents the mean of the offset 92 and the maximum threshold 102. It has been found that an offset, tapered plateau (such as the plateau 88 as shown in FIGS. 5*c* and 5*d*) results in better image enhancement than a tapered plateau applied to the entire histogram (such as the plateau 88 as shown in FIG. 5*b*). Additionally, it has been found that the tapered plateau shown in FIGS. 5*b*-5*d* result in accentuation of pixels having low brightness levels while attenuating high brightness levels.

Figure 5E:
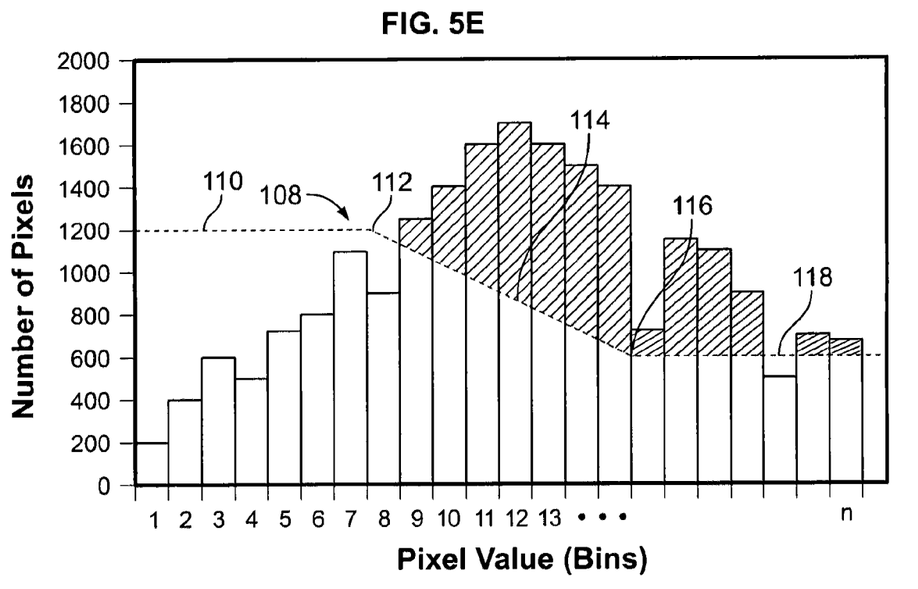
Figure 5F:
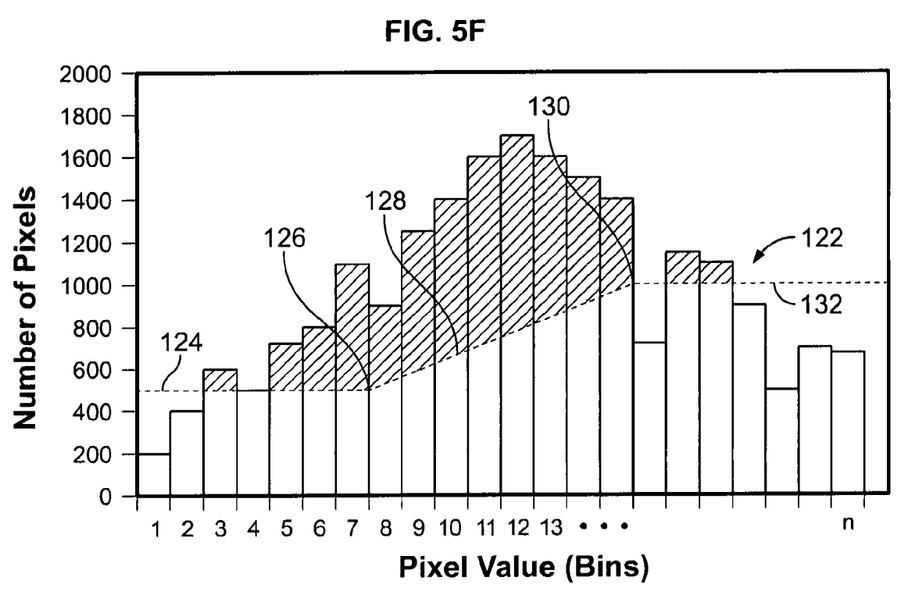
Figure 5G:
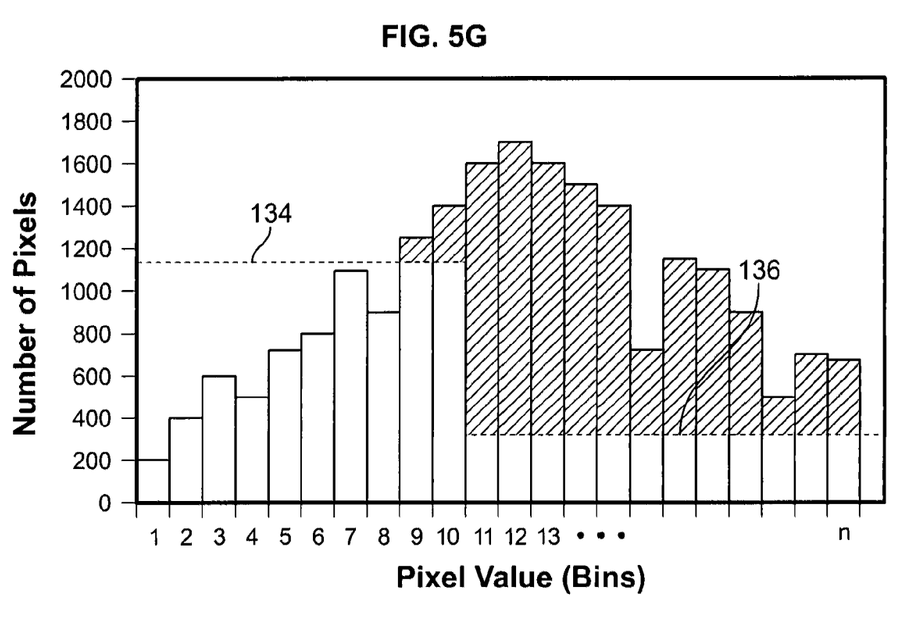

As shown in FIG. 5*e*, the present invention allows for a multi-level plateau 108 to be established, wherein the multi-level plateau 108 includes a high plateau region 110, a first transition point 112, a tapered or sloped plateau region 114, a second transition point 116, and a low plateau region 118. In such an arrangement, dark regions of the input image are enhanced at the expense of bright regions of the image. As shown in FIG. 5*f*, the shape of the multi-level plateau 108 could be altered, such that a multi-level plateau 122 is produced having a low plateau region 124, a first transition point 126, a sloped or tapered region 128, a second transition point 130, and a high plateau region 132. In this arrangement, bright regions of the input image are enhanced at the expense of dark regions of the image. Further, as shown in FIG. 5*g*, two plateaus could be produced, including a first or "dark" plateau 134 for enhancing dark regions in the input image, and a second or "light" plateau 136 for enhancing light regions of the input image. The transition between the dark plateau 134 and the light plateau 136 could occur at a midpoint between an offset and a maximum value, such as the midpoint 100 shown in FIG. 5*d*. It should be appreciated any plateau of any desired size or shape could be implemented without departing from the spirit or scope of the present invention.

The various plateaus capable of being implemented by the present invention, such as those shown in FIGS. 5*a*-5*g*, could be automatically calculated and implemented by a suitable image processing system, based upon the type of enhancement desired by the user. For example, if enhancement of dark regions in an image is desired, a plateau similar to the plateau shown in FIG. 5*g* could be automatically calculated, and the input histogram for the image clipped at the plateau. Moreover, different plateaus could be automatically implemented based upon changing scene conditions, including, but not limited to, changes in scene light levels.

Figure 6A:
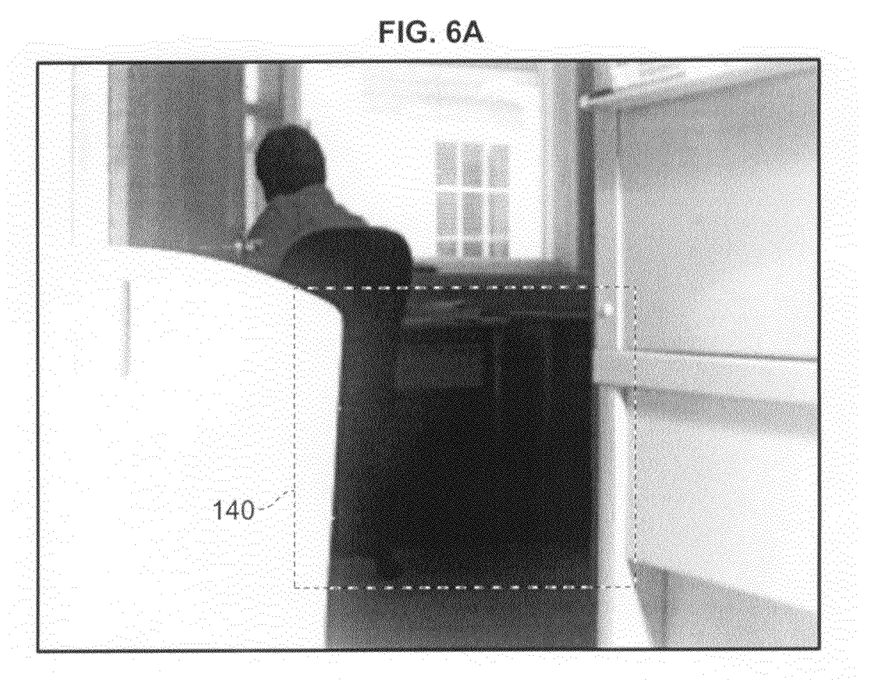
FIGS. 6a-6b are photographs illustrating results of the image enhancement method of the present invention, wherein shadow details are enhanced in a lighted scene.
Figure 6B:
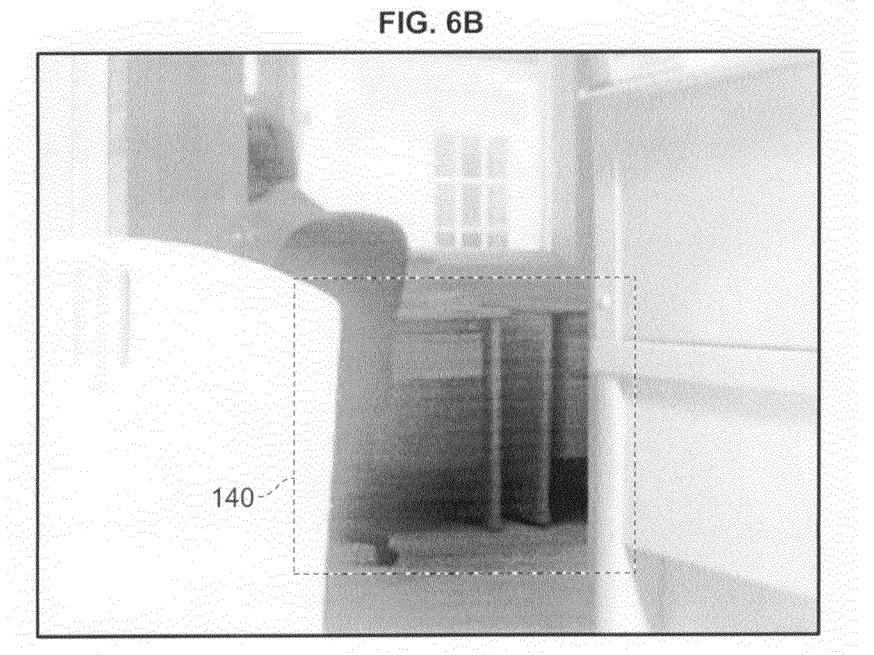

FIGS. 6*a*-6*b* are photographs illustrating results of the image enhancement method of the present invention, wherein shadow details are enhanced in a lighted scene. FIG. 6*a* shows the original input image, wherein a desk lamp is turned on. For purposes of illustration, a shadow region within the box 140 is shown. FIG. 6*b* shows an output image generated by the image enhancement method of the present invention, corresponding to the input image. As can be readily appreciated, a significant amount of additional detail can be seen in the box 140 of the processed image, which detail is otherwise invisible in the original image. The image shown in FIG. 6*b* was produced using a plateau having a shape approximating the plateau shown in FIG. 5*g* and described herein along with the histogram start AGC method and square root post-processing described above.

Figure 7A:
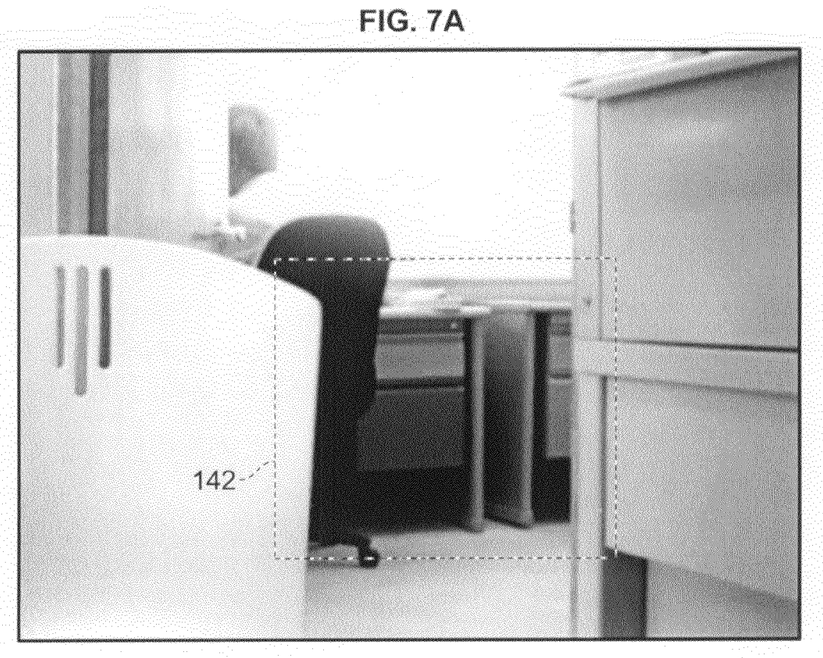
FIGS. 7a-7b are photographs illustrating results of the image enhancement method of the present invention, wherein shadow details are enhanced in a scene having a normal light level.
Figure 7B:
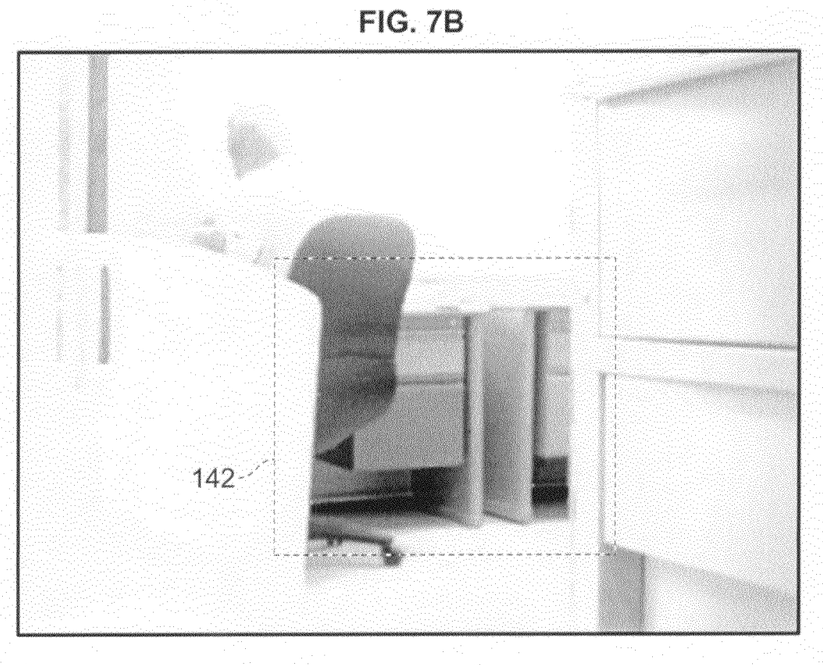

FIGS. 7*a*-7*b* are photographs illustrating results of the image enhancement method of the present invention, wherein shadow details are enhanced in a scene having a normal light level (the desk lamp is off). FIG. 7*a* shows the original input image. For purposes of illustration, a shadow region within the box 142 is shown. FIG. 7*b* shows an output image generated by the image enhancement method of the present invention, corresponding to the input image. As can be readily appreciated, a significant amount of additional detail can be seen in the box 142 of the processed image, which detail is otherwise invisible in the original image. The image shown in FIG. 7*b* was produced using a plateau having a shape approximating the plateau shown in FIG. 5*g* and described herein along with the histogram start AGC method and square root post-processing discussed above.

Figure 8A:
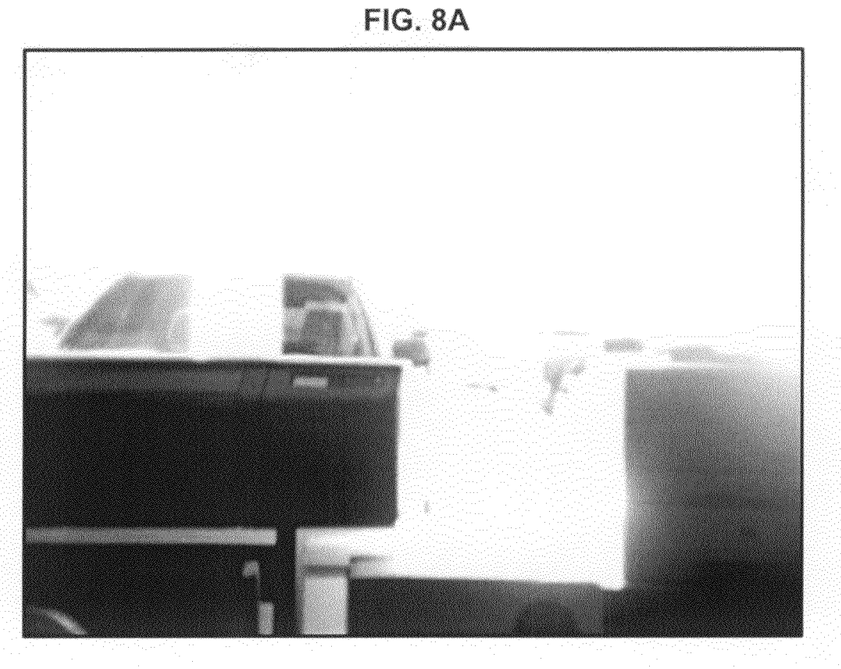
FIGS. 8a-8b are photographs illustrating results of the image enhancement method of the present invention, wherein enhancement of bright regions of an image is provided.
Figure 8B:
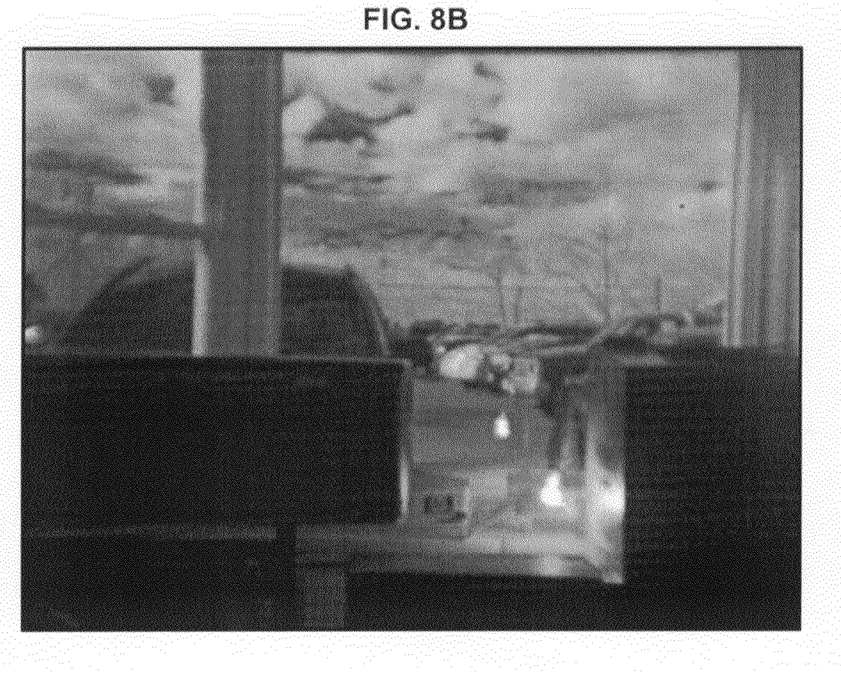

FIGS. 8*a*-8*b* are photographs illustrating results of the image enhancement method of the present invention, wherein enhancement of bright regions of an image is provided. FIG. 8*a* is an image of a parking lot taken on a sunny day, and the image includes very bright regions. FIG. 8*b* shows the results of bright enhancement of the present invention applied to the image of FIG. 8*a*. As can be readily appreciated, a significant amount of detail not visible in the original image (FIG. 8*a*) can clearly be seen in the enhanced image (FIG. 8*b*). The image shown in FIG. 8*b* was produced using a plateau having a shape approximating the plateau shown in FIG. 5g and described herein along with the saturated pixel AGC method and square root post-processing described above.

Figure 9:
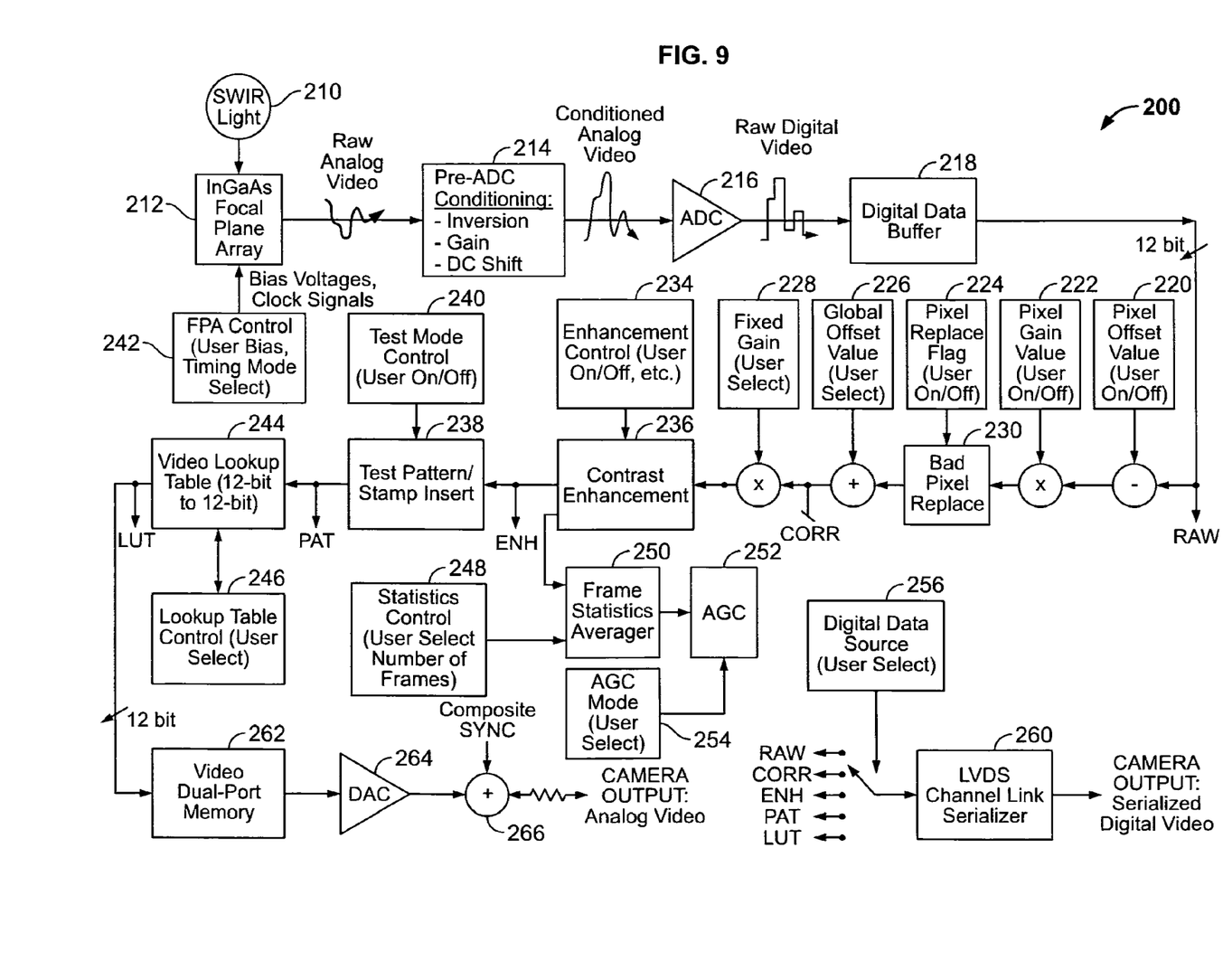
FIG. 9 is a block diagram of a short wavelength infrared (SWIR) camera including the image enhancement functionality of the present invention.

FIG. 9 is a block diagram of a short wavelength infrared (SWIR) camera, indicated generally at 200, which includes the image enhancement functionality of the present invention. The present invention can be implemented in any suitable imaging device and image processing electronics. The camera 200 includes an Indium Gallium Arsenide (InGaAs) focal plane array 212 which receives SWIR light 210 from a scene to be imaged, and FPA control 242. A conditioning module 214 receives raw analog video (image) from the focal plane array 212, and implements a number of adjustments to the raw analog video signal, such as inversion, gain adjustment, and direct current (DC) shifting. The conditioned analog video signal is then processed by an analog-to-digital (ADC) converter 216, to produce a raw digital video signal that is sent to a digital data buffer 218. The raw signal is then processed by one or more image processing modules 220, 222, 224, 226, 228, and 230, each of which can be selectively adjusted and/or switched in or out by a user. Module 220 adjusts the pixel offset value, and can be selectively turned on or off by a user. Module 222 adjusts the pixel gain value, and can also be turned on or off Modules 224 and 230 allow for the replacement of bad pixels in the image, which feature can be selectively activated by the user. Module 226 allows a global offset value to be applied to pixels of the image, which value can be set by a user. Module 228 allows a fixed gain to be applied to the image, which gain value can be specified by the user.

Enhancement control module 234 and contrast enhancement module 236 include the processing logic described herein for implementing variable plateau histogram processing of the image. The enhanced image is sent to a test pattern and stamp insert module 238, in addition to a frame statistics averager module 250. The frame statistics averager module 250 receives information from the statistics control module 248, which allows a user to specify frame or frames to which automatic gain control (AGC) should be applied. The AGC mode select module 254 and the AGC module 252 include the processing logic described herein for implementing enhanced AGC functionality.

The test pattern/stamp insert module 238 receives a test mode signal from the test mode control module 240, which allows a user to specify whether to insert a test pattern into the video stream. In optional video lookup module 244, a lookup table 246 could be utilized to construct the output image of the camera 200 by transforming the input image using the lookup table, for performing optional image correction functions such as gamma correction, etc. The output image is then stored in a video dual-port memory 262, and is subsequently sent to a digital-to-analog (DAC) converter 264 for conversion back to an analog video signal. The analog video signal could be adjusted using a composite synchronization adjustment 266, whereupon the adjusted signal is then available for use.

The camera 200 includes a digital data source selector 256 for allowing a user to select a desired digital signal which corresponds to a desired position along the video processing chain shown in FIG. 9. For example, the user can select between raw digital video ("RAW" in FIG. 9) output, corrected digital video ("CORR" in FIG. 9) output, enhanced digital output ("ENH" in FIG. 9), test pattern video ("PAT" in FIG. 9) output, and look-up table ("LUT" in FIG. 9) output. The desired digital output is sent to a low-voltage differential signaling (LVDS) CHANNEL LINK serializer 260, whereupon the digital signal is available for use. The serializer 260 could comprise a suitable serializer manufactured by National Semiconductor, Inc., which is compatible with the CAMERA LINK standard issued by the Automated Imaging Association (AIA).

The image enhancement method of the present invention (and, in particular, the variable histogram plateau feature) can be automatically adjusted in response to various camera designs and changing environmental conditions. For example, as brightness levels decrease in a scene that is the subject of monitoring over time, the present invention could automatically generate a plurality of histogram plateaus (each of any desired shape or size) that are customized to compensate for changing light levels. Thus, for example, when dim conditions are detected, conventional histogram or plateau equalization processing could be implemented, wherein the post-processing (e.g., $x^p$ and ramp non-linear processes) of the present invention are disabled and a straight plateau is defined and implemented. Further, one or more user-defined plateaus, and/or post-processing settings could be programmed and implemented as desired.

If the present invention is implemented in a standalone system capable of interfacing with a plurality of imaging systems, such a system could be programmed with a plurality of plateaus, an optimal one of which can be automatically selected for a particular camera type or manufacture. Moreover, the present invention could be adapted to operate with one or more sensors which monitor optical conditions within the camera itself, such that the enhancement method is dynamically adapted to conform to such conditions.

Having thus described the invention in detail, it is to be understood that the foregoing description is not limit the spirit and scope thereof. What is desired to be protected by Letters Patent is set forth in appended claims.

What is claimed is:

1. A method for enhancing an image, comprising the steps of:
   constructing an input histogram corresponding to the image, the input histogram representing a pixel intensity distribution corresponding to the image;
   determining an offset bin and a threshold bin in the input histogram;
   calculating a clipping start bin based upon the offset bin and the threshold bin, the clipping start bin and the threshold bin being at different locations in the input histogram;
   establishing a variable plateau profile to be applied to the input histogram;
   selectively identifying a plurality of bins of the input histogram to be clipped using the variable plateau profile;
   clipping the plurality of bins of the input histogram at the variable plateau profile and between the calculated clipping start bin and the threshold bin to produce a clipped input histogram;
   constructing a cumulative histogram from the clipped input histogram;
   normalizing the cumulative histogram to produce a normalized cumulative histogram; and
   transforming the image using the normalized cumulative histogram to produce an enhanced output image corresponding to the input image, wherein at least a portion of the input image is enhanced in the output image.

2. The method of claim 1, further comprising excluding saturated pixels in the image from the input histogram.

3. The method of claim 2, further comprising excluding low level pixels in the image from the input histogram.

4. The method of claim 1, wherein the step of establishing the variable plateau profile comprises determining an enhancement type desired by a user and calculating a plateau profile corresponding to the enhancement type.

5. The method of claim 1, wherein the step of establishing the variable plateau profile comprises automatically determining scene conditions and constructing a plateau profile based upon the scene conditions.

6. The method of claim 5, further comprising automatically constructing a plateau profile for enhancing dark regions of the image when dark scene conditions are detected.

7. The method of claim 6, further comprising automatically constructing a plateau profile for enhancing light regions of the image when bright scene conditions are detected.

8. The method of claim 1, further comprising performing non-linear operations on the normalized cumulative histogram prior to transforming the image.

9. The method of claim 8, wherein the step of performing non-linear operations further comprises calculating a square root of the normalized cumulative histogram to produce a resulting cumulative histogram.

10. The method of claim 9, wherein the step of performing non-linear operations further comprises multiplying the resulting cumulative histogram by a ramp function (n+bin/[highest bin])/(n+1), where bin represents a current bin and highest bin represents a highest bin in the resulting cumulative histogram.

11. The method of claim 9, wherein the step of performing non-linear operations further comprises multiplying the resulting cumulative histogram by $(n+\sin(\pi/2*bin/[highest\ bin]))(n+1)$, where bin represents a current bin and highest bin represents a highest bin in the resulting cumulative histogram.

12. The method of claim 1, further comprising interpolating between bins to produce the enhanced output image.

13. The method of claim 12, wherein the step of interpolating between bins comprises dividing a current pixel value by a bin divider of $2^n$ to produce a result and a remainder.

14. The method of claim 13, wherein the step of interpolating between bins further comprises looking up a first pixel value corresponding to a bin of the normalized cumulative histogram using the result.

15. The method of claim 14, wherein the step of interpolating between bins further comprises looking up a second pixel value corresponding to an adjacent bin of the normalized cumulative histogram.

16. The method of claim 15, wherein the step of interpolating between bins further comprises calculating a difference between the first pixel value and the second pixel value and multiplying the difference by a ratio of the remainder to the bin divider $2^n$ to produce an interpolated pixel value.

17. The method of claim 16, wherein the step of interpolating between bins further comprises including the interpolated pixel value in the enhanced output image.

18. The method of claim 12, wherein the step of interpolating between bins further comprises constructing a first lookup table containing cumulative histogram data and a second lookup table containing differences between entries in the first lookup table.

19. The method of claim 18, further comprising utilizing said first and second lookup tables to calculate interpolated pixel values.

20. The method of claim 1, further comprising selectively adjusting gain of the output image.

21. The method of claim 20, wherein the step of selectively adjusting gain of the output image further comprises processing pixels of the output image using a boxcar averager.

22. The method of claim 1, wherein the step of establishing the variable plateau profile further comprises establishing a sloped plateau profile.

23. The method of claim 1, wherein the step of establishing the variable plateau profile further comprises establishing first and second plateaus for clipping the input histogram.

24. The method of claim 23, wherein the step of establishing first and second plateaus further comprises establishing a dark plateau for enhancing dark regions in the image and a light plateau for enhancing light regions in the image.

25. The method of claim 1, wherein the step of calculating the clipping start bin further comprises calculating a midpoint plateau value and a maximum plateau value prior to establishing the variable plateau profile.

26. The method of claim 25, wherein the step of establishing the variable plateau profile comprises establishing the variable plateau profile between the midpoint plateau value and the maximum plateau value.

27. An apparatus for enhancing an image, comprising:
an imaging device for capturing an input image;
a contrast enhancement module for receiving and processing the input image, wherein the contrast enhancement module constructs an input histogram corresponding to the input image, determines an offset bin and a threshold bin in the input histogram, calculates a clipping start bin based upon the offset bin and the threshold bin, the clipping start bin and the threshold bin being at different locations in the input histogram, constructs a variable plateau for clipping the input histogram, selectively identifies a plurality of bins of the input histogram to be clipped using the variable plateau, clips the plurality of bins of the input histogram along the variable plateau and between the clipping start bin and the threshold bin, generates a cumulative histogram from the clipped input histogram, and generates a normalized cumulative histogram by normalizing the cumulative histogram; and
means for generating an output image based upon the normalized cumulative histogram.

28. The apparatus of claim 27, wherein the contrast enhancement module determines a desired enhancement type specified by a user.

29. The apparatus of claim 28, wherein the contrast enhancement module constructs the variable plateau in accordance with the desired enhancement type.

30. The apparatus of claim 28, wherein the contrast enhancement module constructs a sloped plateau.

31. The apparatus of claim 27, wherein the contrast enhancement module automatically constructs the variable plateau in response to scene conditions.

32. The apparatus of claim 27, wherein the contrast enhancement module constructs a plateau having a first plateau region for enhancing dark areas of the input image and a second plateau region for enhancing bright areas of the input image.

33. The apparatus of claim 27, further comprising an automatic gain control module for adjusting gain of the input image.

34. The apparatus of claim 33, wherein the automatic gain control modules includes user-selectable gain control modes for providing additional enhancement of the input image.

* * * * *